United States Patent
Nasta et al.

(10) Patent No.: US 6,829,310 B1
(45) Date of Patent: Dec. 7, 2004

(54) METHOD OF HIGH AND LOW BIT RATE TRANSMISSION ON THE COMMAND LINK OF A SATELLITE

(75) Inventors: Rodolphe Nasta, Toulouse (FR); Emile Tonello, St Lys (FR)

(73) Assignee: Alcatel, Paris (FR)

( * ) Notice: Subject to any disclaimer, the term of this patent is extended or adjusted under 35 U.S.C. 154(b) by 721 days.

(21) Appl. No.: 09/710,887

(22) Filed: Nov. 14, 2000

(30) Foreign Application Priority Data

Nov. 29, 1999 (FR) .............................. 99 14973

(51) Int. Cl.$^7$ .................... H04L 27/20; H04L 27/06
(52) U.S. Cl. ................ 375/295; 375/302; 375/316; 375/322
(58) Field of Search ................ 375/211, 213, 375/130, 219, 220, 240, 295, 316; 455/12.1, 13.4, 69; 244/3.1, 3.19; 348/554, 558

(56) References Cited

U.S. PATENT DOCUMENTS 4,691,236 A 9/1987 Kanno et al. .............. 348/554
4,918,532 A * 4/1990 O'Connor ................... 348/726
5,835,847 A * 11/1998 Gilmore et al. ............ 455/12.1

FOREIGN PATENT DOCUMENTS

WO    WO 99/21287    4/1999

OTHER PUBLICATIONS

Jerry D. Gibson, "The Communications Handbook", CRC Press, 1997, pp. 1046–1048.*

* cited by examiner

Primary Examiner—Chieh M. Fan
Assistant Examiner—Jason M. Perilla
(74) Attorney, Agent, or Firm—Sughrue Mion, PLLC

(57) ABSTRACT

The invention relates to the command link of a satellite, also referred to as the telemetry, tracking and control link. Depending on the bit rate needed for the link, the invention proposes using either direct modulation of a carrier to transmit at high bit rates or subcarrier modulation of the carrier to transmit at low bit rates. The invention also proposes a receiver and a transmitter for receiving and transmitting on the command link.

10 Claims, 1 Drawing Sheet

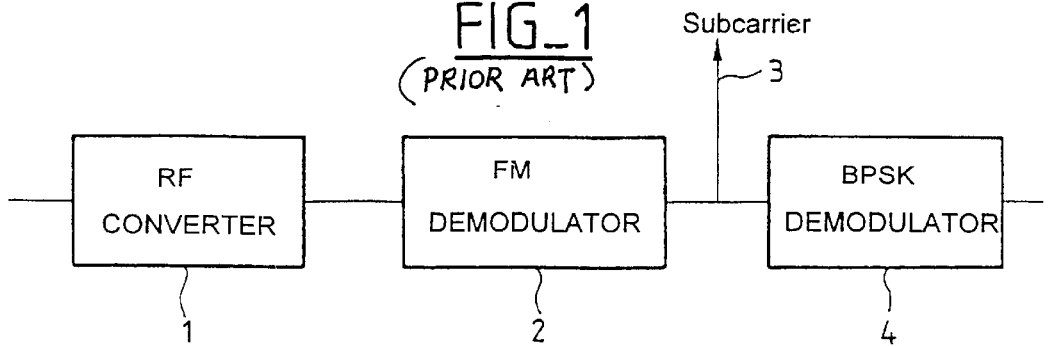
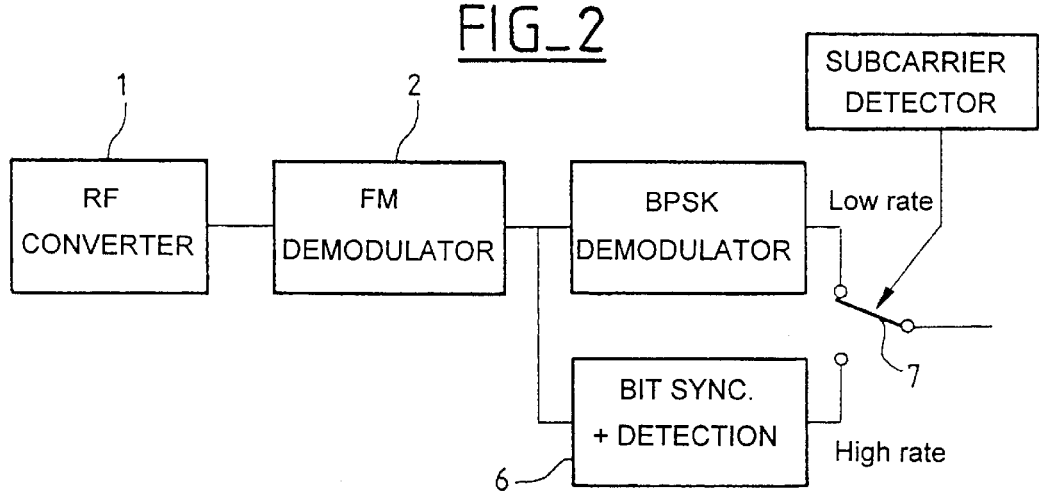
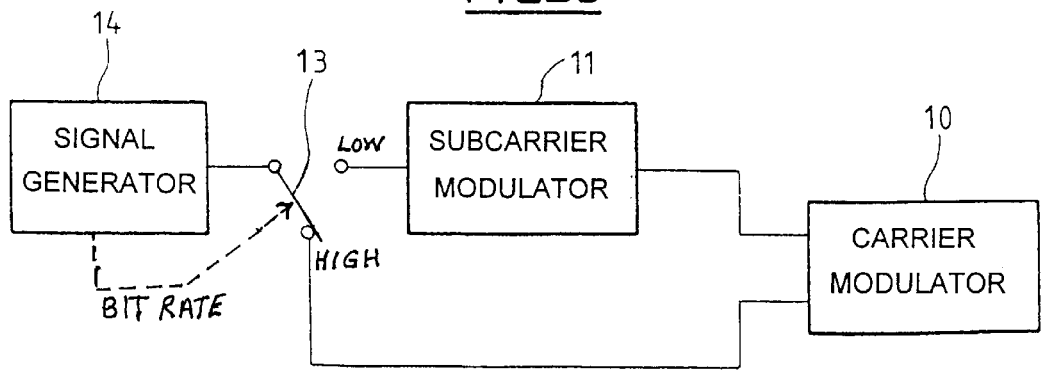

METHOD OF HIGH AND LOW BIT RATE TRANSMISSION ON THE COMMAND LINK OF A SATELLITE

This application claims priority to French Application No. 99-14973 filed Nov. 29, 1999, which is hereby incorporated by reference.

FIELD OF THE INVENTION

The present invention relates to satellites and more particularly to transmitting and receiving control and telemetry signals to and from satellites via the telemetry and command link, which is also used for measuring the distance between satellites and ground stations. The link is usually referred to as the telemetry, tracking, and command (TTC) link or the telemetry, command, and ranging (TCR) link. It must be established very reliably during all stages in the life of a satellite, of which there are four:

- a station injection stage, which corresponds to the period between the satellite being injected into orbit by the launch vehicle and reaching its final position;
- a station-keeping stage, which corresponds to the stage in which the satellite is in normal operation;
- a standby stage, which corresponds to an equipment failure and therefore does not always occur, and during which the attitude of the satellite can change; and
- a deactivation stage, also referred to as orbital ejection, during which the satellite is moved to a cemetery orbit or re-enters the atmosphere.

BACKGROUND OF THE INVENTION

It is important for the TTC link to be maintained throughout all the above stages, for which purpose satellites are provided with antennas. A first set of omnidirectional antennas is used during the station injection and standby stages, during both of which the payload of the satellite is not active and the attitude of the satellite can vary.

The payload of the satellite is active and the satellite retains a nominal position during its station-keeping stage. A directional antenna can therefore be used.

Both antennas are generally connected to a redundant command receiver which demodulates the signals received and usually processes low bit rates, of the order of 1 kbit/s. Subcarrier modulation is used by prior art satellites, for example NRZ/BPSK/FM modulation in the case of the ARABSAT, ASTRA, STENTOR, NILESAT, etc. satellites. This entails modulating a subcarrier using a NRZ (no return to zero) waveform and BPSK (binary phase shift keying) modulation. The subcarrier is at a frequency of the order of 8 kHz, for example, and is used to frequency modulate the carrier, which is at frequencies of around 5800 MHz–6700 MHz in the case of systems operating in the C band or at frequencies of around 12700 MHz–14800 MHz in the case of systems operating in the Ku band, for example, with a frequency excursion of the order of 400 kHz.

U.S. Pat. No. 4,691,236 describes a receiver for use in a satellite telecommunications system. To alleviate the effects of inclement weather, it proposes transmitting signals to the satellite in two modes. In a first, clear sky transmission mode, frequency modulated picture, sound and data signals are transmitted to the satellite; the picture signals are modulated at a frequency of up to 4.5 MHz and the sound and data signals are quaternary PSK modulated onto a 5.727 MHz subcarrier. In a second, standby transmission mode, only sound and data signals are transmitted, using direct frequency modulation of the carrier. It is thus possible to use all of the available band when the sky is clear and to transmit sound and data signals in the bandwidth available in standby mode. The above document suggests determining which transmission mode to use by detecting the presence of baseband synchronization signals after the carrier has been demodulated in the receiver. Video signals are present only in the clear-sky transmission mode. The above document is silent on the problem of satellite control. Also, the above document teaches modulating the subcarrier only to shift the frequency of sound and data signals in order to enable them to be frequency division multiplexed with picture signals.

WO-A-99 21287 describes a method of compensating variations in the quality of an RF link, such as a satellite link. It proposes changing from QPSK modulation to BPSK modulation if the link quality is degraded, which produces a 3 dB improvement. The bit rate is halved for the same symbol frequency.

A problem that is sometimes encountered nowadays is that of increasing satellite command bit rates, caused in particular by the increasing complexity of payloads and their increasing control demands.

OBJECTS AND SUMMARY OF THE INVENTION

An object of the invention is to solve this problem. Through minor modifications of existing receivers, it enables different bit rates to be used on the command link of a satellite in different stages of the life of the satellite. The invention avoids any need for a multiplicity of receivers and retains a low bit rate for the satellite station injection and standby stages. The link budget is maintained during these stages, despite the use of large-coverage, low-gain antenna (s). The invention also enables automatic changeover from one bit rate to the other.

To be more precise, the invention provides a method of transmitting on the command link of a satellite, the method including:

- at least one stage of direct modulation of a carrier for transmission on the link at high bit rates; and
- at least one stage of subcarrier modulation of said carrier for transmission on the link at low bit rates.

In one implementation, direct modulation is used during a stage in which the satellite is pointed at the Earth, such as the station-keeping stage.

In another embodiment, subcarrier modulation is used during a stage in which the satellite is not pointed at the Earth, for example during the station injection stage or the standby stage.

The invention also provides a receiver for the command link of a satellite, the receiver including:

- a carrier demodulator;
- a subcarrier demodulator receiving the signals supplied by the carrier demodulator; and
- bit synchronization and detection means receiving the signals supplied by the carrier demodulator.

The receiver preferably also includes a switch receiving as input the signals supplied by the subcarrier demodulator and by the bit synchronization and detection means. The switch can be controlled as a function of the presence of a subcarrier in the signals supplied by the carrier demodulator.

The invention further provides a satellite including a receiver of the above kind.

The invention further provides a transmitter for the command link of a satellite, the transmitter including:

a signal generator;

a switch receiving the signals supplied by the signal generator;

a subcarrier modulator receiving the signals from one output of the switch; and a carrier modulator receiving the signals from the other output of the switch or the subcarrier modulator.

The switch is advantageously controlled as a function of the bit rate of the signals supplied by the signal generator.

BRIEF DESCRIPTION OF THE DRAWINGS

Other features and advantages of the invention will become apparent on reading the following description of embodiments of the invention, which is given by way of example only and with reference to the accompanying drawings, in which:

FIG. 1 is a block diagram of a prior art receiver for a satellite command link,

FIG. 2 is a block diagram of a receiver in accordance with the invention, and

FIG. 3 is a block diagram of a transmitter in accordance with the invention.

MORE DETAILED DESCRIPTION

To enable the bit rates on a satellite command link to be varied, the invention proposes using subcarrier modulation at low bit rates and direct modulation at high bit rates. This solution retains the existing antennas and requires only minor modifications to existing receivers and transmitters. Low bit rate is suitable for the station injection and standby stages, during which the payload is not active. High bit rate is suitable for the station-keeping stage, during which the payload is active; it meets increased demand for control of the payload.

FIG. 1 is a diagram of a prior art receiverfor a satellite command link. The receiver is suitable for the example referred to above of NRZ/BPSK/FM modulation and includes radio frequency (RF) converter means 1 which reduce the frequency of the signals received at the antenna for subsequent processing. The signals at the reduced frequency are supplied to an FM demodulator 2 which demodulates the frequency modulation of the signals. The subcarrier is then extracted, as symbolized by the arrow 3, and a BPSK demodulator 4 demodulates the subcarrier to recover an NRZ signal from which the bits are extracted. This receiver performs well at the low bit rates which are currently used for satellite command links.

FIG. 2 is a block diagram of a receiver in accordance with the invention, which includes, in addition to the components of the prior art receiver, a second channel enabling direct demodulation. Bit synchronization and detection means 6 are connected to the output of the FM demodulator and demodulate the directly modulated carrier, which is frequency modulated by NRZ pulses, for example, with a frequency excursion of the order of 400 kHz. Bits are recovered at the output of the bit synchronization and detection means 6.

The signals at the output of the low bit rate BPSK demodulator 4 are supplied to one input of a switch 7. Another input of the switch 7 receives the signals at the output of the bit synchronization and detection means 6. As shown in the figure, the position of the switch 7 is conditioned by the presence of the subcarrier: when the subcarrier is detected in the signal supplied by the FM demodulator, subcarrier modulation at a low bit rate is present; however, if the subcarrier is not detected in the signal supplied by the FM demodulator, direct modulation is present. The presence of the subcarrier can therefore condition the use of the high bit rate demodulator system (which consists of the FM demodulator and the bit synchronization and detection means) or the low bit rate demodulator system (which consists of the FM demodulator and the BPSK demodulator).

The position of the switch 7 can also be controlled by equipment other than the receiver, for example the onboard computer. The position of the switch can also be conditioned by a criterion other than presence or absence of the subcarrier: this criterion can be a decision taken onboard as a function of the satellite's current stage. The position of the switch can also be conditioned by the pointing of the satellite, for example to select direct demodulation when the satellite is pointed at the Earth or subcarrier demodulation when the satellite is not pointed at the Earth. Subcarrier demodulation can be selected on changing to the standby stage, for example.

A circuit that is symmetrical to the FIG. 2 circuit can be used for transmission. In other words, and as shown in FIG. 3, a modulator 10 can modulate a carrier. The modulator is driven by signals from a low bit rate modulation system or by high bit rate signals. The low bit rate modulation system includes a subcarrier modulator 11 which receives the low bit rate signals. The high bit rate signals are applied directly to the carrier modulator. As in the FIG. 2 example, a switch 13 can be provided at the output of the signal generator 14 and controlled as a function of the signal bit rate.

At a more general level, the invention proposes modulating a carrier on the command link of a satellite differently according to the bit rates required. The bit rates can be controlled as a function of the stages of the life of the satellite, as explained above. For the low bit rates, the carrier is modulated by a subcarrier which is itself modulated by the signals to be transmitted. For the high bit rates, the signals to be transmitted modulate the carrier directly.

In the above example, the waveform of the signals to be transmitted is an NRZ waveform. The invention does not apply only to this type of pulse, however, but also to other waveforms, for example any form of RZ signals.

In the example the subcarrier is BPSK modulated. Other types of subcarrier modulation can be used, in particular FSK modulation (frequency shift keying) with any number of states, or PBK modulation (phase shift keying).

The modulation of the carrier by the subcarrier can be not only frequency modulation, as in the example, but also phase modulation.

The direct modulation of the carrier can also be frequency modulation or phase modulation. In addition to the example of NRZ/FM modulation, the direct modulation could be any PCM/FM modulation, for example Manchester, 2-stage-L or -M, NRZ-M or -S, etc. modulation.

To simplify the receiver, it is advantageous for the modulation of the carrier to be identical for direct modulation and for subcarrier modulation. The structure of the carrier demodulated in the receiver or the carrier modulated in the transmitter can be simplified in this case.

Using the same waveform for direct modulation of the carrier and for modulation of the subcarrier (the NRZ waveform in the example) enables the same signal generator to be used for the relatively high and low bit rates and further simplifies the structure of the transmitter.

Preferred pairs of low bit rate modulation and high bit rate modulation are set out in the following table:

| Low bit rate subcarrier modulation | High bit rate direct modulation |
| --- | --- |
| NRZ/BPSK/FM | NRZ/FM |
| NRZ/BPSK/PM | NRZ/PM |
| NRZ/FSK/FM | NRZ/FM |
| NRZ/FSK/PM | NRZ/PM |

In all cases, a bit rate of the order of 1 kbit/s, or more generally less than 10 kbit/s, can be obtained for low bit rates. A bit rate of the order of 100 kbit/s and above, and more generally greater than 50 kbit/s, can be obtained for high bit rates.

The invention requires no duplication of hardware, merely adaptation of the existing receiver. It enables transmission at low bit rates, and can therefore advantageously be used during the station injection and standby stages, with one or more omnidirectional antennas. The link budget is maintained, despite the relatively low gain of the antenna. More generally, subcarrier modulation can be used during all stages in which the satellite is not pointed at the Earth.

The invention enables high bit rate transmission on the command link of the satellite during the station-keeping stage of the satellite. More generally, direct modulation can be used during any stage which requires high bit rate transmission and in which the satellite is pointed at the Earth.

Of course, the present invention is not limited to the examples and embodiments described and shown, and lends itself to many variants that will be evident to the skilled person.

What is claimed is:

1. A method of transmitting on a command link of a satellite, the method including:
   at least one stage of direct modulation of a carrier for transmission on the command link at high bit rates; and
   at least one stage of subcarrier modulation of said carrier for transmission on the command link at low bit rates,
   wherein the at least one stage of subcarrier modulation is used during a stage of the satellite in which the satellite is not pointed at the Earth.

2. The method of claim 1, wherein subcarrier modulation is used during a station injection stage of the satellite.

3. The method of claim 1, wherein subcarrier modulation is used during a standby stage of the satellite.

4. A receiver for a command link of a satellite, the receiver including:
   a command link carrier demodulator supplying high bit rate signals and modulated low bit rate signals;
   a command link subcarrier demodulator receiving the modulated low bit rate signals supplied by the carrier demodulator during a stage of the satellite in which the satellite is not pointed at the Earth; and
   bit synchronization and detection means receiving the high bit rate signals supplied by the carrier demodulator.

5. The receiver of claim 4, including a switch receiving, as input, signals outputted both by the subcarrier demodulator and also by the bit synchronization and detection means.

6. The receiver of claim 5, wherein the switch is controlled as a function of the presence of a subcarrier in the signals supplied by the carrier demodulator.

7. A transmitter for a command link of a satellite, the transmitter including:
   a signal generator;
   a switch receiving low bit rate and high bit rate signals supplied by the signal generator;
   a command link subcarrier modulator receiving the low bit rate signals from one output of the switch during a stage of the satellite in which the satellite is not pointed at the Earth; and
   a carrier modulator receiving the high bit rate signals from another output of the switch, or receiving the modulated low bit rate signals from an output of the subcarrier modulator during a stage of the satellite in which the satellite is not pointed at Earth.

8. The transmitter of claim 7, wherein the switch is controlled as a function of the bit rate of the signals supplied by the signal generator.

9. The method according to claim 1, wherein each of the direct modulation and the subcarrier modulation is frequency modulation or phase modulation.

10. The method according to claim 1, wherein the modulation of the carrier is identical for the direct modulation and the subcarrier modulation.

* * * * *